United States Patent

Austin

[15] 3,636,766
[45] Jan. 25, 1972

[54] VELOCITY METER
[72] Inventor: Philip R. Austin, Livonia, Mich.
[73] Assignee: Contamination Control Laboratories, Livonia, Mich.
[22] Filed: May 11, 1970
[21] Appl. No.: 36,211

[52] U.S. Cl. ............................................................73/228
[51] Int. Cl. ............................................................G01f 1/00
[58] Field of Search ..........................................73/228, 189

[56] References Cited

UNITED STATES PATENTS 2,935,872  5/1960  Misner......................................73/189

FOREIGN PATENTS OR APPLICATIONS 418,720  12/1910  France.....................................73/189

*Primary Examiner*—Jerry W. Myracle
*Attorney*—Olsen and Stephenson

[57] ABSTRACT

Apparatus for measuring the velocity of flow of a fluid. The apparatus is an extremely simple, lightweight, low-cost item comprising a frame formed from a single strip of sheet material, a vane hingedly connected in pendulum fashion to the frame and responsive to the rate of flow of the fluid for movement to a position corresponding to the velocity of flow of the fluid. Indicia are located on the frame to indicate the rate of flow of the fluid. Adjustment means are provided for altering the shape of the frame a limited extent so as to set the static position of the vane at a zero position on the indicia. The apparatus can be mounted in a variety of positions for the purpose of measuring the rate of flow of the fluid.

10 Claims, 6 Drawing Figures

PATENTED JAN25 1972 3,636,766

INVENTOR
PHILIP R. AUSTIN

BY *Olsen and Stephenson*

ATTORNEYS

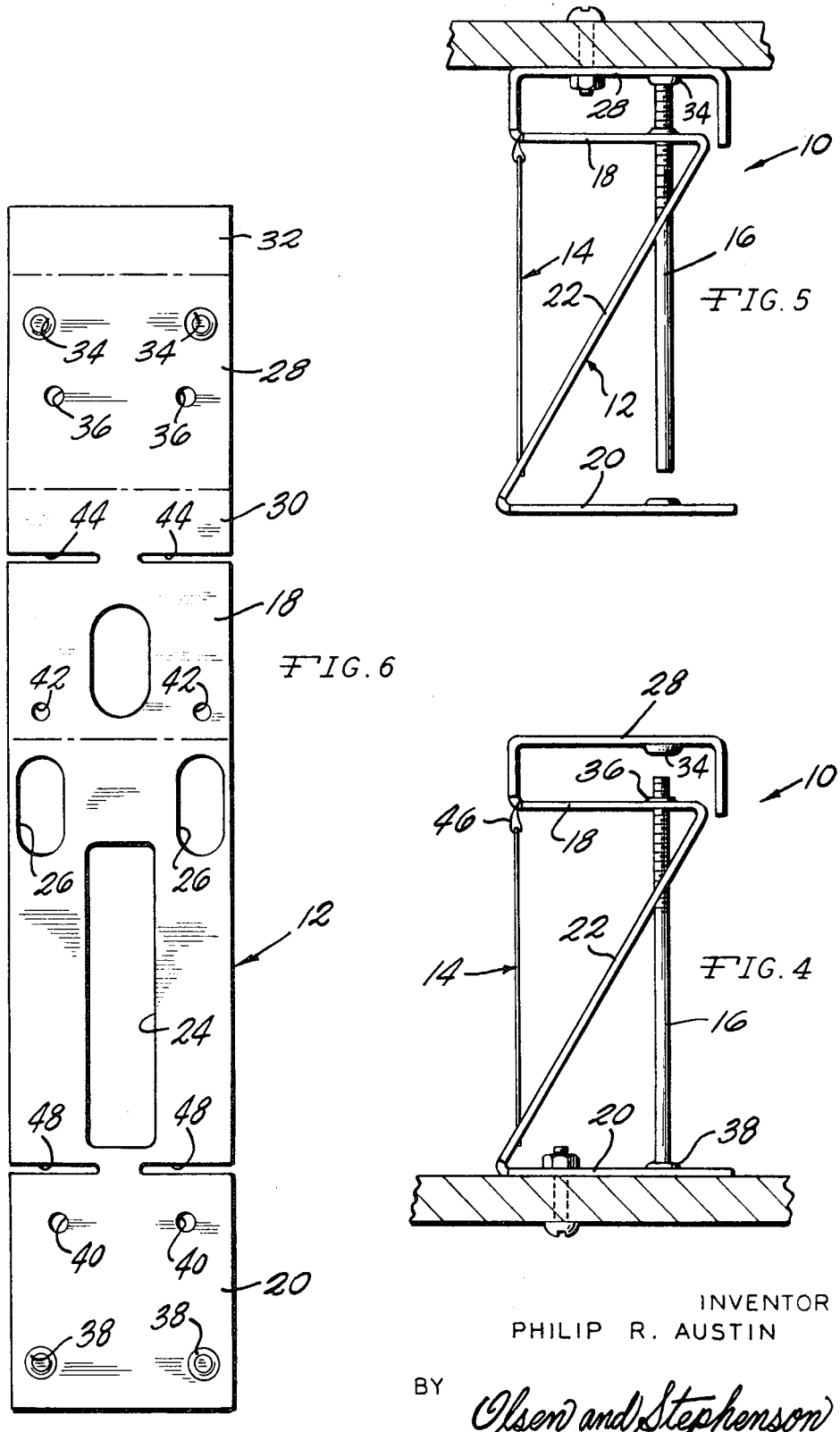

VELOCITY METER

BACKGROUND OF THE INVENTION

The present invention relates to a meter for indicating the velocity of flow of a fluid, and more particularly to such a meter for use in connection with contamination control problems.

Velocity meters for indicating the rate of flow of fluids are known, but those that are available in the prior art leave much to be desired from the standpoint of simplicity, durability and cost. In the field of contamination control, it is frequently necessary to utilize a relatively low cost, simple device which will readily indicate upon visual inspection air velocity, or the velocity of other similar fluids which have passed through filters, or the like. Information relative to the rate of flow can then be very useful for indicating the condition of filters, and the like. For purposes such as this it is highly desirable that a velocity meter be readily adapted for mounting in any suitable position in the fluid stream where the rate of flow is readily determined by visual inspection of the meter. It is also desirable that the meter be of a low-cost construction so that it can be used freely where needed, and when so used that it will not readily be impaired by contaminants or other materials that may flow in the fluid stream. It is also highly desirable that a unit be provided that has application in a large number of situations so that low cost can be assured by use of a single standardized unit.

SUMMARY OF THE INVENTION

The present invention has overcome the shortcomings of the prior art and is constructed and arranged so that a minumum of parts are provided which are not readily subject to damage from the environment in which it may be used or from abusive treatment to which it may be subjected.

According to one form of the present invention, a velocity meter is provided for measuring the velocity of flow of fluid comprising a frame formed from a strip of resilient sheet material so as to define a Z-shaped portion with upper and lower horizontal legs joined by an inclined intermediate leg, and a bracket portion extending from the end of one of the legs in a reversed direction. The intermediate leg has a longitudinal slot, and a vane is hingedly suspended on a transverse axis from the upper horizontal leg so as to extend into the slot for free movement therein in response to flow of fluid through the slot. The intermediate leg has a calibrated surface adjacent to the slot to indicate the velocity of flow corresponding to the position of the vane. A pair of adjustment rods are threadedly connected to the one horizontal leg and are axially movable when turned for engagement with either the bracket portion or the other of the horizontal legs for selectively deflecting the frame for setting the position of the calibrated surface relative to the static position of the vane. Normally, the vane and the frame will be constructed from stainless steel of suitable gage, but other suitable materials may also be used which are compatible with the environment in which the velocity meter is to be used.

The velocity meter can be supported by the bracket portion or one of the horizontal legs, and the meter can be positioned so that the flow of fluid in any direction can be passed through the slot of the intermediate leg for measuring the rate of fluid flow.

Accordingly, it is an object of the present invention to provide an improved velocity meter for indicating the rate of the flow of a fluid, such meter being characterized by its easy readability, its low cost and trouble-free construction, and its ready adaptability for use in a wide variety of environments.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 4 is a side elevational view of the embodiment, showing the meter in its operative position when mounted in position on a lower supporting surface;

FIG. 5 is a side elevational view similar to that of FIG. 4, but showing the meter in its operative position when supported from an upper supporting surface;

FIG. 6 is a developed view of the sheet material after having been stamped but before being formed to the shape of the frame.

DESCRIPTION OF THE PREFERRED EMBODIMENT

Figure 1:
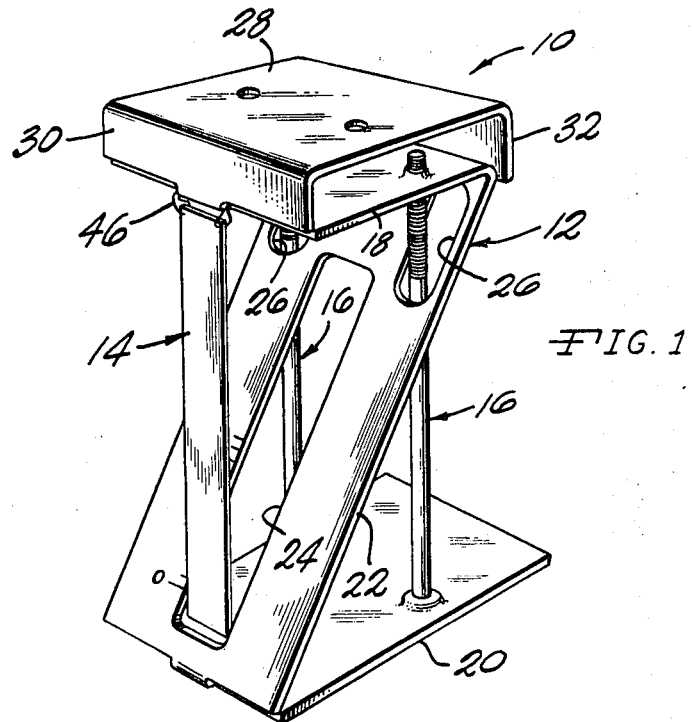
FIG. 1 is a perspective view of a velocity meter embodying one form of the present invention.
Figure 2:
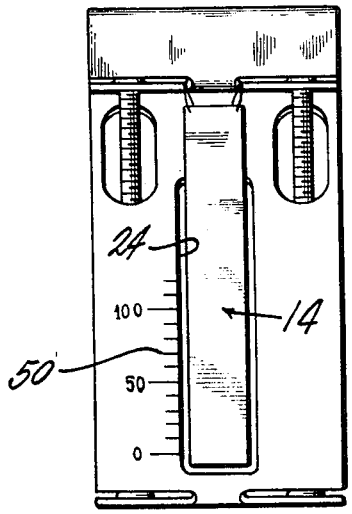
FIG. 2 is a front elevational view of the embodiment of the invention illustrated in FIG. 1.
Figure 3:
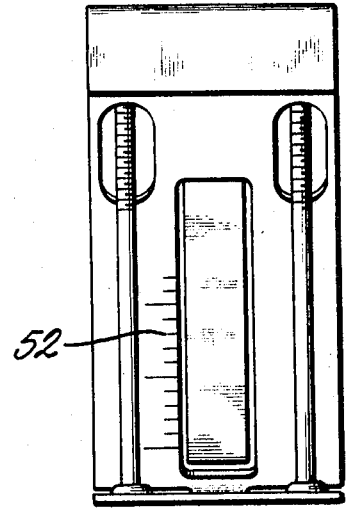
FIG. 3 is a rear elevational view of the embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The velocity meter 10 embodying the present invention includes the frame 12, the hingedly suspended vane 14, and the pair of adjustment rods 16.

The frame 12 is formed from a strip of resilient sheet material, such as stainless steel or the like, and is formed to define a Z-shaped portion defined by upper and lower horizontal legs 18 and 20 which are joined by an inclined intermediate leg 22. The intermediate leg 22 has a longitudinal slot 24 formed therein, and also has a pair of apertures 26 through which the adjustment rods 16 are adapted to pass. Forming an extension of and bent in a reverse direction with respect to the upper leg 18 is a bracket portion 28 for mounting and adjustment purposes which has a front face 30 and a rear face 32.

Normally, the frame 12 can be formed from a stamping, such as is shown best in FIG. 6. In the stamping operation, dimples 34 preferably will be formed in the bracket portion 18, and mounting holes 36 similarly are introduced. Dimples 38 and mounting holes 40 also are formed in the lower horizontal leg 20. The upper horizontal leg 18 has holes 42 formed therein for threadedly receiving the adjustment rods 16, for a purpose to be described.

Between the upper horizontal leg 18 and the bracket portion 28, slots 44 are provided to facilitate bending of the frame to the position shown in FIG. 1, and also to provide an arrangement whereby a hinge 46 can readily be provided for suspending the vane 14 from the forward end of the horizontal leg 18. As thus seen in FIG. 1, the hinge arrangement provided is one in which a thread is connected to the upper opposite corners of the vane 14 and is fitted over the webbing between the upper horizontal leg 18 and the front face 30 of the bracket portion 28. This arrangement provides a substantially friction-free hinge for suspending the vane 14 in pendulumlike fashion from the upper horizontal leg 18. Slots 48 are also cut between the intermediate leg 22 and the lower horizontal leg 20 to facilitate bending the frame to the final position. The slots 44 and 48 facilitate the alignment of the vane 14 in the slot 24 by use of the adjustment rods 16, as will be described.

The intermediate leg 24 has on its front surface indicia or a calibrated surface 50, and on its rear face a similar calibrated surface or indicia 52 for indicating the extent of displacement of the vane 14 produced by the flow of fluid against the vane and thereafter through the slot 24 of the velocity meter. The greater the velocity of the fluid, the greater will be the displacement of the vane. Initially, when mounting the velocity meter 10 in position, such as is shown in FIG. 4, the vane 14, in the absence of movement of fluid will be suspended in a vertical position, and it is then desirable to adjust the frame position so that the vane is aligned with the "0" marking at the lower end of the calibrated surface 50 or 52. This can readily be accomplished by adjustment of the rods 16 which are threadedly connected in the apertures 36, the lower end of the rods 16 being seated in the sockets or dimples 38. By turning the rods 16, thrust can be exerted upwardly against the upper horizontal leg 18, thereby changing the shape of the resilient frame 12 to an extent necessary to align the vane 14 properly with respect to the desired marking on the calibrated surface 50, 52.

Similarly, if it is desired to mount the velocity meter 10 from an upper supporting surface, such as is shown in FIG. 5, the rods 16 can be screwed upwardly until the upper ends of the rods are seated in the dimples or sockets 34 so that further turning of the rods 16 will again have the effect of distorting the shape of the frame 12, again to permit proper alignment of the vane 14 with respect to the calibrated surfaces 50, 52.

It is to be understood that the velocity meter 10 is not restricted to being mounted on upper or lower surfaces as shown in FIGS. 5 and 6, but if desired, the velocity meter 10 can also be mounted on vertical surfaces by use of the faces 32 or 30. If vertical flow of fluid is to be measured, this can readily be accomplished by placing the instrument in a tunnel so that a portion of the flow in the tunnel must pass downwardly through an opening forward of the meter 10 after which all fluid passing through the opening must in turn pass through the slot 24 for discharge from the rearward side of the meter. When so used, an observer can readily determine the rate of flow merely by observing the position of the vane 14 with respect to the calibrated surfaces 50, 52.

Thus, a very simple instrument has been provided which can readily be subjected to a variety of different environments without injuring the instrument. The instrument is light in weight and can readily be transported at low cost. It can be adapted for a large variety of uses, and is characterized by its simple construction permitting a relatively low-cost unit to be manufactured.

It will also be recognized that the velocity meter 10 can be formed from any suitable material which is compatible with the environment in which the fluid velocity is to be measured. Thus, the component parts can be made from stainless steel, nonferrous metals, organic plastic materials, fiber glass and the like. Also, it will be recognized that other forms of low-friction hinge arrangements can be provided for suspending the vane 14 in a pendulumlike fashion from the upper horizontal leg 18 of the frame of the meter. The vane 14 and the slot 24 will normally be cut to any desired configuration most suitable for providing the desired sensitivity of measurement that is required. Thus, in the arrangement illustrated in FIG. 1, the instrument is most sensitive at low velocity, when the vane approaches its vertical position. If desired, the configuration of the vane can be modified, and the slot 24 can be similarly modified so that a more sensitive area of measurement occurs when the vane is inclined to a higher position. Also, the vane 14 can be provided in a variety of weights so that the velocity meter 10 can readily be used in a variety of different conditions of fluid flow merely by changing the vane 14.

It is claimed:

1. A velocity meter for measuring the velocity of flow of fluid comprising a frame having a calibrated surface with a longitudinal slot, and a vane of thin gage material throughout its length supported by said frame for movement in said slot relative to said calibrated surface as a function of the velocity of flow of fluid against said vane.

2. The velocity meter that is defined by claim 1, wherein said vane is hingedly suspended as a pendulum from one portion of said frame, and said calibrated surface is on another portion of said frame adjacent to the path of free movement of said hingedly suspended vane.

3. The velocity meter that is defined in claim 2, wherein adjustment means are provided for selectively setting the position of the calibrated surface relative to the static position of said vane.

4. The velocity meter for measuring the velocity of flow of fluid comprising a frame having a calibrated surface, and a vane supported by said frame for movement relative to said calibrated surface as a function of the velocity of flow of fluid against said vane, said frame having a Z-shaped sheet portion providing a lower horizontal leg, an upper horizontal leg and an inclined intermediate leg joined at its lower end to the lower leg and at its upper end to the upper leg, said inclined intermediate leg having a longitudinal slot adjacent to which said calibrated surface is located, said vane being hingedly supported from the distal end of said upper leg and extending into said slot.

5. The velocity meter that is defined in claim 4, wherein an adjustment rod is threadedly connected to one of said legs and is adapted when turned to exert a thrust against a supporting surface for the velocity meter so as to deflect said frame for setting the position of said calibrated surface relative to the static position of said vane.

6. The velocity meter that is defined in claim 4, wherein one of said horizontal legs has a return bent bracket portion for mounting the meter on a supporting surface.

7. The velocity meter that is defined in claim 6, wherein a vertical adjustment rod is threadedly connected to said one horizontal leg and is axially movable when turned for engagement with either said bracket or the other of said horizontal legs.

8. A velocity meter for measuring the velocity of flow of fluid comprising a frame formed from a strip of resilient sheet material to define a Z-shaped portion with upper and lower horizontal legs joined by an inclined intermediate leg and a bracket portion extending from the end of one of said legs in a reverse direction, said intermediate leg having a longitudinal slot, a vane hingedly suspended on a transverse axis from the upper horizontal leg so as to extend into said slot for free movement therein to a predetermined location in response to flow of fluid of predetermined velocity through said slot, said intermediate leg having a calibrated surface adjacent to said slot to indicate the velocity of flow corresponding to the position of said vane, and at least one adjustment rod threadedly connected to said one horizontal leg and axially movable when turned for engagement with either said bracket portion or the other of said horizontal legs for selectively setting the position of the calibrated surface relative to the static position of said vane.

9. The velocity meter that is defined in claim 8, wherein two adjustment rods are threadedly connected to said horizontal leg adjacent to opposite sides of said frame, and said bracket portion and said other horizontal leg have dimples formed therein for receiving the ends of said rods to maintain the latter in vertical alignment when the rods are moved axially for adjustment purposes.

10. The velocity meter that is defined in claim 8, wherein said frame is formed from a strip of stainless steel.

* * * * *